US012007231B2

(12) United States Patent
Zhao et al.

(10) Patent No.: US 12,007,231 B2
(45) Date of Patent: Jun. 11, 2024

(54) DIRECT-INK-WRITING METHOD FOR PRINTING STRAIN GAUGE ARRAY CIRCUIT

(71) Applicant: JIANGNAN UNIVERSITY, Wuxi (CN)

(72) Inventors: Junhua Zhao, Wuxi (CN); Peishi Yu, Wuxi (CN); Zhiyang Guo, Wuxi (CN); Lixin Qi, Wuxi (CN); Yu Liu, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 343 days.

(21) Appl. No.: 17/702,164

(22) Filed: Mar. 23, 2022

(65) Prior Publication Data

US 2022/0221265 A1    Jul. 14, 2022

Related U.S. Application Data

(63) Continuation of application No. PCT/CN2021/128568, filed on Nov. 4, 2021.

(30) Foreign Application Priority Data

Sep. 22, 2020  (CN) .......................... 202011000678.1

(51) Int. Cl.
*G01B 7/16* (2006.01)
*G01L 1/22* (2006.01)
(52) U.S. Cl.
CPC .............. *G01B 7/20* (2013.01); *G01L 1/2287* (2013.01)

(58) Field of Classification Search
CPC ........ G01B 7/20; G01L 1/2287; H05K 3/467; H05K 3/0011; H05K 3/1275
(Continued)

(56) References Cited

U.S. PATENT DOCUMENTS

| 6,740,900 B2 * | 5/2004 | Hirai ..................... H10K 10/466 257/40 |
| 7,713,862 B2 * | 5/2010 | Cho ........................ B33Y 80/00 438/618 |

(Continued)

FOREIGN PATENT DOCUMENTS

| CN | 105336582 A | 2/2016 |
| CN | 106248266 A | 12/2016 |

(Continued)

*Primary Examiner* — Jacques M Saint Surin
(74) *Attorney, Agent, or Firm* — SZDC Law PC

(57) ABSTRACT

A novel direct-ink-writing (DIW) method for printing a strain gauge array circuit is disclosed. Firstly, the whole circuit is layered by a 3D printing method; a thin layer of insulating material is printed on the first circuit layer, instead of printing an insulating bridge, to form the second insulating layer; a part needing to contact the second insulating layer is not printed, but one through hole is reserved; the second circuit layer is then printed; the functional layer of the strain gauge is finally covered; the electrodes on the functional layer can contact the second circuit layer or can contact the first circuit layer through the through holes, which ensures that the functional layer contacts the two circuit layers, and also ensures the insulation in a cross part of a matrix circuit; the printing of the array strain gauge is effectively completed; and the stability of measurement is ensured.

5 Claims, 3 Drawing Sheets

(58) Field of Classification Search
USPC .......................................................... 177/153
See application file for complete search history.

(56) References Cited

U.S. PATENT DOCUMENTS

| | | | | |
|---|---|---|---|---|
| 7,982,139 | B2* | 7/2011 | Kariya | H05K 1/162 |
| | | | | 174/262 |
| 10,119,869 | B1* | 11/2018 | Keränen | G01G 7/00 |
| 11,910,536 | B2* | 2/2024 | Yu | H05K 3/4664 |
| 2011/0226069 | A1 | 9/2011 | Kim et al. | |
| 2018/0259315 | A1 | 9/2018 | Nakamura et al. | |

FOREIGN PATENT DOCUMENTS

| | | | |
|---|---|---|---|
| CN | 107449349 | A | 12/2017 |
| CN | 107843364 | A | 3/2018 |
| CN | 108495474 | A | 9/2018 |
| CN | 109002214 | A | 12/2018 |
| CN | 110572939 | A | 12/2019 |
| CN | 112188759 | A | 1/2021 |
| KR | 20120099938 | A | 9/2012 |
| WO | 9811499 | A1 | 3/1998 |

* cited by examiner

DIRECT-INK-WRITING METHOD FOR PRINTING STRAIN GAUGE ARRAY CIRCUIT

TECHNICAL FIELD

The present invention relates to the field of strain gauges and the field of 3D printing layered circuits, and in particular, to a novel direct-ink-writing (DIW) method for printing a strain gauge array circuit.

BACKGROUND

A resistive strain gauge is a sensing device that converts a strain change on a measured object into an electric signal. A single resistive strain gauge can only measure a strain of a single point. Therefore, in order to realize the measurement of strains of a plurality of points, it is necessary to perform array design to form a strain gauge array circuit.

A matrix circuit provides an idea for the design of the strain gauge array circuit. A horizontal circuit and a longitudinal circuit cross each other. Each cross position forms a measurement point, and the electrical signal of each measurement point can be obtained in the form of row scanning or column scanning. However, the matrix circuit inevitably has the problem of cross insulation between the horizontal circuit and the longitudinal circuit. In order to ensure the insulation between the circuits, the current practice is usually to bridge and glue the cross position between the horizontal circuit and the longitudinal circuit during printing of a first layer of line, but this will generate a raised step at a glued part, which will affect the printing accuracy of a second layer of line and will easily cause an open circuit under a tensile stress.

SUMMARY

Technical Problem

The matrix circuit inevitably has the problem of cross insulation between the horizontal circuit and the longitudinal circuit. In order to ensure the insulation between the circuits, the current practice is usually to bridge and glue the cross position between the horizontal circuit and the longitudinal circuit during printing of a first layer of line, but this will generate a raised step at a glued part, which will affect the printing accuracy of a second layer of line and will easily cause an open circuit under a tensile stress.

Technical Solution

In view of the above-mentioned problems and technical requirements, the inventors have provided a novel DIW method for printing a strain gauge array circuit. The technical solution of the present invention is as follows:

A novel DIW method for printing a strain gauge array circuit is provided, the method including:
forming a first insulating layer by DIW printing on a planar substrate using an insulating material;
forming m parallel spaced first silver lines by DIW printing on the insulating layer using conductive silver paste to form a first circuit layer, wherein one end of each first silver line includes an electrode lead-out end;
forming a second insulating layer by DIW printing on other regions of the first circuit layer except the respective electrode lead-out ends using the insulating material, wherein n through holes are respectively formed in a position of the second insulating layer that directly faces each first silver line at an interval, and all the through holes form an m*n row and column structure; the respective electrode lead-out ends of the first silver lines and the first silver lines at the respective through holes are all exposed with respect to the second insulating layer;
printing n parallel spaced second silver lines on the second insulating layer using conductive silver paste to form a second circuit layer, wherein each second silver line respectively includes a main line and m branches connected thereto, and the main line of the second silver line is perpendicular to the first silver line and has one end including an electrode lead-out end;
forming m*n strain gauge head electrodes, m*n strain gauge tail electrodes, and m*n connecting wires by DIW printing using conductive carbon paste to form a functional layer, wherein one strain gauge head electrode is respectively printed at each through hole of the second insulating layer; the strain gauge head electrodes are communicated to the first silver lines on the first circuit layer through the through holes on the second insulating layer; one strain gauge tail electrode is printed at the tail end of the branch of each second silver line on the second circuit layer; each strain gauge head electrode corresponds to one strain gauge tail electrode and is connected to the strain gauge tail electrode through a connecting wire;
printing and forming a third insulating layer using an insulating material to complete encapsulation, wherein the third insulating layer covers other regions except the electrode lead-out ends of the first circuit layer, the electrode lead-out ends of the second circuit layer, and the strain gauge head electrodes and the strain gauge tail electrodes on the functional layer.

According to a further technical solution, a spacing between the through holes, directly facing each first silver line, on the second insulating layer is 3 mm.

According to a further technical solution, each through hole on the second insulating layer is a 0.5 mm×0.5 mm square hole.

According to a further technical solution, each second silver line is printed on the second insulating layer and is printed corresponding to a corresponding row of m through holes; the row of m through holes corresponding to the second silver line directly face m first silver lines, respectively; and each branch of the second silver line is printed on one side of one of the through holes in a manner of being parallel to the first silver line.

According to a further technical solution, the method further includes:
after a silver paste material is stirred using a planetary stirrer at 2000 rpm for 3 min, putting the conductive silver paste into a printing syringe, and performing centrifugation at 3000 rpm for 3 min to remove bubbles from the silver paste material, thus preparing the conductive silver paste used for printing and forming the first circuit layer and the second circuit layer.

According to a further technical solution, when the first circuit layer and the second circuit layer are printed and formed using the conductive silver paste, the conductive silver paste is accommodated in the printing syringe for printing; after the conductive silver paste is printed, curing is completed to form the corresponding circuit layers; the viscosity of the conductive silver paste is 10000 cP; the inner diameter of a printing needle head of the printing syringe is 110 μm; a printing line distance is 100 μm; a printing speed is 3 mm/s; an extrusion air pressure is 0.65 MPa; and during curing, an oven is used for drying at 70° C. for 15-30 min.

According to a further technical solution, when the first insulating layer, the second insulating layer, and the third insulating layer are printed and formed using an insulating material, the insulating material is accommodated in a printing syringe for printing; after the insulating material is printed, curing is completed to form the corresponding insulating layers; the inner diameter of a printing needle head of the printing syringe is 110 μm; a printing line distance is 100 μm; a printing speed is 10 mm/s; an extrusion air pressure is 0.1 MPa; and during curing, curing is performed under a UV curing lamp for 10 min.

According to a further technical solution, the method further includes:

after a carbon paste material is stirred using a planetary stirrer at 2000 rpm for 2 min, putting the carbon paste material into a printing syringe, and performing centrifugation at 3000 rpm for 3 min to remove bubbles from the carbon paste material, thus preparing the conductive carbon paste used for printing and forming the functional layer.

According to a further technical solution, when the functional layer is printed and formed using the conductive carbon paste, the conductive carbon paste is accommodated in a printing syringe for printing; the viscosity of the conductive carbon paste is 30000 cP; the inner diameter of a printing needle head of the printing syringe is 110 μm; a printing line distance is 100 μm; a printing speed is 10 mm/s; and an extrusion air pressure is 0.65 MPa.

According to a further technical solution, when the functional layer is printed and formed using the conductive carbon paste, after the conductive carbon paste is printed, an oven is used for drying at 120° C. for 15 min or the conductive carbon paste is placed at a room temperature for 3 days to complete curing, thus forming the functional layer.

According to a further technical solution, a thickness of the first insulating layer is in a range of 45-75 μm.

According to a further technical solution, absolute ethanol and absorbent cotton are used to sufficiently clean the planar substrate before DIW printing on the planar substrate to form the first insulating layer.

Beneficial Effects

The present application discloses a novel direct-ink-writing method for printing a strain gauge array circuit. Firstly, the whole circuit is layered by a 3D printing method; a thin layer of insulating material is printed on the first circuit layer, instead of printing an insulating bridge, to form the second insulating layer; a part needing to contact the second insulating layer is not printed, but one through hole is reserved; local glue dispensing is changed to regional glue dispensing and local hole reserving; this through hole can ensure that the functional layer of a strain gauge contacts the two circuit layers, and also ensure the insulation in a cross part of a matrix circuit; the problems of low relevant position accuracy caused by the local glue dispensing, an extremely large positioning error of the syringe in the process of multiple curing and printing, and mutual interference between the horizontal and longitudinal circuits can be solved; the printing of the array strain gauge is effectively completed; and the stability of measurement is ensured.

DETAILED DESCRIPTION

Reference will now be made in detail below to the specific implementations of the present invention in the accompanying drawings.

Figure 1:
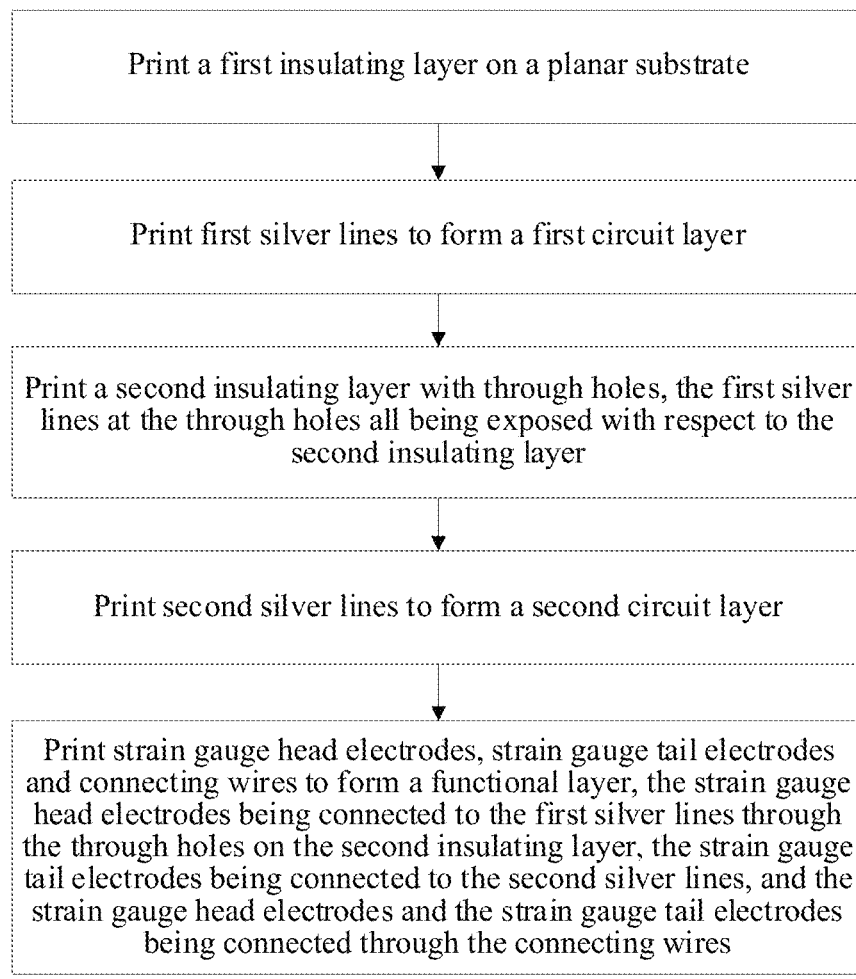
FIG. 1 is a flow chart of a novel DIW printing method disclosed in the present application.

The present application discloses a novel direct-ink-writing method for printing a strain gauge array circuit. Referring to the flow chart shown in FIG. 1, the method includes the following steps:

In step S1, an insulating material is used for DIW printing on a planar substrate to form a first insulating layer 1. Before the first insulating layer 1 is printed, the planar substrate is firstly sufficiently cleaned with anhydrous ethanol and absorbent cotton, and then printing is carried out.

The insulating material used in the present application is anycubic. Before formal printing, a certain amount of anycubic is put into an opaque printing syringe; the printing syringe is connected to an air pressure control valve, and is clamped on a numerical control three-axis motion platform to perform printing on the planar substrate in a 3D printing and DIW manner. After debugging, with regard to this type of anycubic, in the present application, it is set that the inner diameter of a printing needle head of the printing syringe is 110 μm, a printing line distance is 100 μm, a printing speed is 10 mm/s, and an extrusion air pressure is 0.1 MPa. At this time, higher printing quality can be achieved. After the insulating material is printed, the insulating material is cured under a UV curing lamp for 10 min, and the first insulating layer 1 is finally formed. A thickness of the first insulating layer 1 formed in the present application is in a range of 45-75 μm. The printing of this layer effectively ensures the planarity of the first insulating layer and ensures insulation between a printed circuit and the planar substrate.

Figure 2:
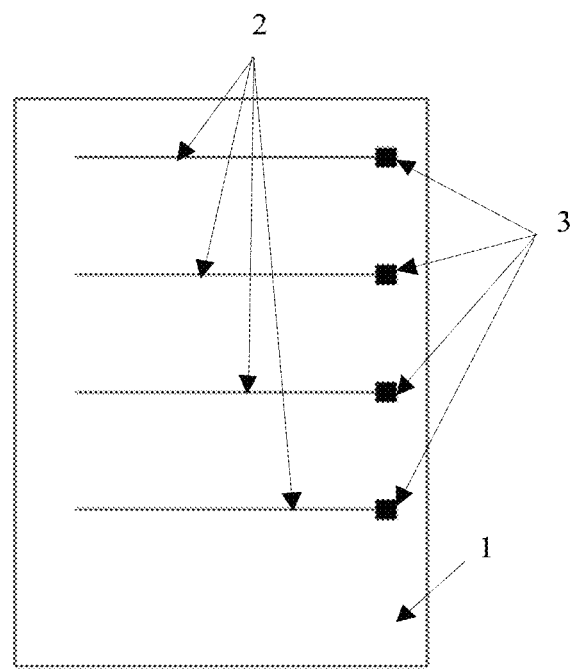
FIG. 2 is a structural diagram after printing of a first circuit layer is completed in the present application.

In step S2, conductive silver paste is used for forming m parallel spaced first silver lines 2 on the insulating layer by DIW printing to form a first circuit layer, wherein one end of each first silver line 2 includes an electrode lead-out end 3. As shown in FIG. 2, m=4 and the first silver line 2 being a transverse circuit is as an example. The size of the electrode lead-out end 3 at the tail end of the first silver line 2 in the present application is 1 mm×1 mm.

Before the use of the conductive silver paste for printing, a conductive silver paste with high conductivity used in the present application needs to be prepared first. A preparation method includes: after a silver paste material (XRK-8000H) is stirred using a planetary stirrer at 2000 rpm for 3 min, putting the conductive silver paste into a printing syringe, and performing centrifugation at 3000 rpm for 3 min to remove bubbles from the silver paste material, thus preparing the conductive silver paste used for printing and forming the first circuit layer and the second circuit layer. The step of preparing the conductive silver paste may be performed before the printing of the circuit layer, or may be performed before the formal printing, i.e., the step S1, which is not limited in the present application.

When the first circuit layer is printed, a certain amount of the conductive silver paste is put into an opaque printing syringe. The printing syringe is connected to an air pressure control valve, and is clamped on a numerical control three-axis motion platform to perform printing in a 3D printing and DIW manner. After debugging, with regard to the conductive silver paste with viscosity of 10000 cP, in the present application, it is set that the inner diameter of the printing needle head of the printing syringe is 110 μm, a printing line distance is 100 μm, a printing speed is 3 mm/s, and an extrusion air pressure is 0.65 MPa. At this time, higher printing quality can be achieved. After the conductive silver paste is printed, an oven is used for drying at 70° C. for 15 to 30 min to finally form the first circuit layer.

Figure 3:
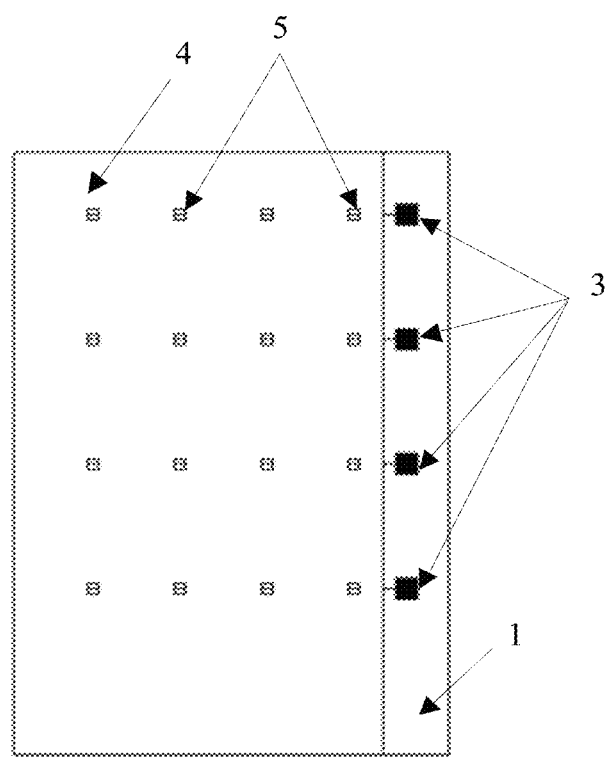
FIG. 3 is a structural diagram after printing of a second insulating layer is completed in the present application.

In step S3, the insulating material is used for by DIW printing on the first circuit layer except the respective electrode lead-out ends 3 to form the second insulating layer 4, as shown in FIG. 3. During printing of the second insulating layer 4, the insulating material, the printing step, the printing parameters, and the curing parameters used are all the same as those for printing of the first insulating layer 1 in the step S1, and the present application does not make repeated descriptions.

A position, directly facing each first silver line 2, of the second insulating layer 4 obtained by printing is provided with n through holes 5 at intervals, and all the through holes form an m*n row-and-column structure. In practical operation, values of m and n are generally the same. As in FIG. 3, m=n=4 is taken as an example. In the present application, each through hole on the second insulating layer 4 is a 0.5 mm×0.5 mm square hole, and a spacing between the respective through holes directly facing each first silver line 2 is 3 mm.

As shown in FIG. 3, actually, the second insulating layer 4 covers a region of the first silver line 2 except the electrode lead-out ends 3 and also covers a region of the first insulating layer 1 that is exposed with respect to the first circuit layer. After the second insulating layer 4 has been printed, each electrode lead-out end 3 of the first silver line 2 and the first silver line 2 at each through hole are exposed with respect to the second insulating layer 4.

Figure 4:
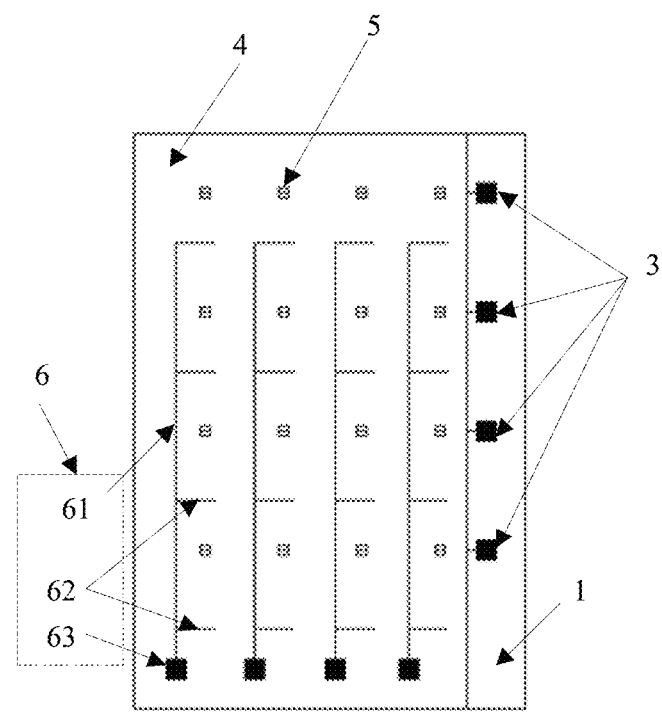
FIG. 4 is a structural diagram after printing of a second circuit layer is completed in the present application.

In step S4, conductive silver paste is used to print n parallel spaced second silver lines 6 on the second insulating layer 4 to form a second circuit layer, wherein each second silver line 6 respectively includes a main line 61 and m branches 62 connected thereto, and the main line 61 of the second silver line 6 is perpendicular to the first silver line 2 and has one end including an electrode lead-out end 63. Generally, each branch 52 is parallel to the first silver line 2. On the basis that the first silver lines 2 are horizontal lines, n=4, as shown in FIG. 4, the second circuit layer has four second silver lines 6 whose main lines are longitudinal. In the present application, a length of the main line 61 of the second silver line is 21 mm; one branch 62 is provided on each second silver line at an interval of 6.5 mm; a length of each branch is 2 mm; and the size of the electrode lead-out end 63 is 1 mm×1 mm.

In the present application, each second silver line 6 is printed on the second insulating layer 4 and is printed corresponding to a corresponding row of m through holes; the row of m through holes corresponding to the second silver line 6 directly face m first silver lines 2, respectively; each branch of the second silver line 6 is printed on one side of one of the through holes in a manner of being parallel to the first silver line 2. FIG. 4 illustrates that each branch is printed below one of the through holes.

During printing of the second circuit layer, the conductive silver paste, the printing step, the printing parameters, and the curing parameters used are all the same as those for printing of the first circuit layer in the step S2, and the present application does not make repeated descriptions.

Figure 5:
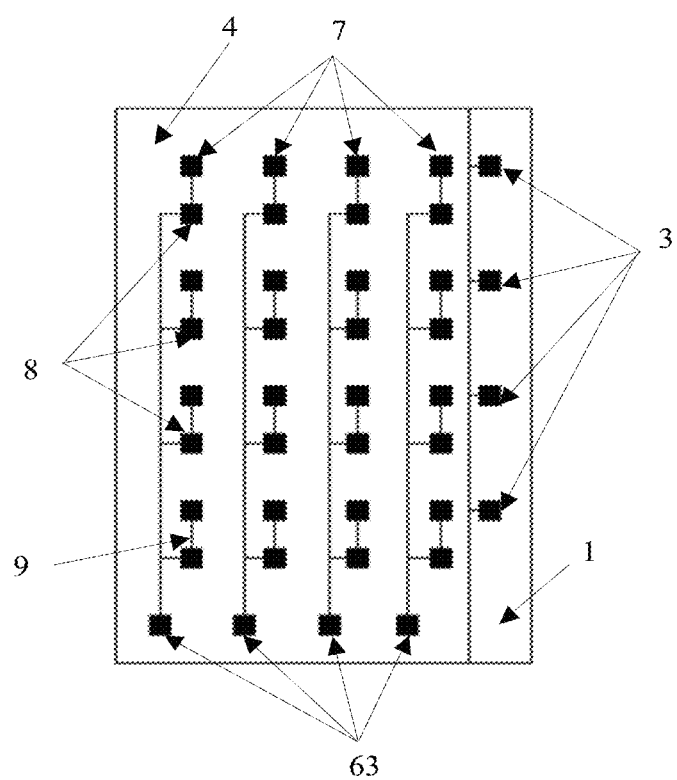
FIG. 5 is a structural diagram after printing of a functional layer is completed in the present application.

In step S5, conductive carbon paste is used for forming m*n strain gauge head electrodes 7, m*n strain gauge tail electrodes 8 and m*n connecting wires 9 by DIW printing to form a functional layer, referring to FIG. 5. One strain gauge head electrode 7 is respectively printed at each through hole 5 of the second insulating layer 4; the strain gauge head electrodes 7 are communicated to the first silver lines 2 on the first circuit layer through the through holes 5 on the second insulating layer 4; one strain gauge tail electrode 8 is printed at the tail end of the branch 62 of each second silver line 6 on the second circuit layer; each strain gauge head electrode 7 corresponds to one strain gauge tail electrode 8 and is connected to the strain gauge tail electrode through a connecting wire 9. In the present application, the sizes of the strain gauge head electrode 7 and the strain gauge tail electrode 8 are both 1 mm×1 mm, and the length of the connecting wire 9 is 1.5 mm.

Before the use of the conductive carbon paste for printing, a conductive carbon paste with high conductivity used in the present application needs to be prepared first. A preparation method includes: after a carbon paste material (CH-8, JEL-CON) is stirred using a planetary stirrer at 2000 rpm for 2 min, putting the carbon paste material into a printing syringe, and performing centrifugation at 3000 rpm for 3 min to remove bubbles from the carbon paste material, thus preparing the conductive carbon paste used for printing and forming the functional layer. The step of preparing the conductive carbon paste may be performed before the printing of the functional layer, or may be performed before the formal printing, i.e., the step S1, which is not limited in the present application.

When the functional layer is printed, a certain amount of the conductive carbon paste is put into an opaque printing syringe. The printing syringe is connected to an air pressure control valve, and is clamped on a numerical control three-axis motion platform to perform printing in a 3D printing and DIW manner. After debugging, with regard to the conductive carbon paste with viscosity of 30000 cP, the inner diameter of the printing needle head of the printing syringe is 110 μm; a printing line distance is 100 μm; a printing speed is 10 mm/s; and an extrusion air pressure is 0.65 MPa. At this time, higher printing quality can be achieved. After the conductive carbon paste is used, an oven is used for drying at 120° C. for 15 min or the conductive carbon paste is placed at a room temperature for 3 days to complete curing, thus forming the functional layer.

In step S6, an insulating material is used for printing and forming a third insulating layer to complete encapsulation, wherein the third insulating layer covers other regions except the electrode lead-out ends 3 of the first circuit layer, the electrode lead-out end 62 of the second circuit layer, and the strain gauge head electrodes 7 and the strain gauge tail electrodes 8 on the functional layer. During printing of the third insulating layer, the insulating material, the printing step, the printing parameters, and the curing parameters used are all the same as those for printing of the first insulating layer 1 in the step S1, and the present application does not make repeated descriptions. The third insulating layer is an encapsulation layer to ensure the working performance of a sample, and the electrode lead-out ends on the two circuit layers and all the electrodes on the functional layer are exposed with respect to the third insulating layer, so as to facilitate outward lead measurement.

The above descriptions are merely preferred implementations of the present application, and the present invention is not limited to the above embodiments. It can be understood that other improvements and changes directly derived or associated by those skilled in the art, without departing from the spirit and conception of the present invention, shall all fall within the protection scope of the present invention.

What is claimed is:

1. A novel direct-ink-writing (DIW) method for printing a strain gauge array circuit, the method comprising:

forming a first insulating layer by DIW printing on a planar substrate using an insulating material;

forming m parallel spaced first silver lines by DIW printing on the insulating layer using conductive silver paste to form a first circuit layer, wherein one end of each first silver line comprises an electrode lead-out end;

forming a second insulating layer by DIW printing on other regions of the first circuit layer except the respective electrode lead-out ends using the insulating material, wherein n through holes are respectively formed in a position of the second insulating layer that directly faces each first silver line at an interval, and all the through holes form an m*n row and column structure; the respective electrode lead-out ends of the first silver lines and the first silver lines at the respective through holes are all exposed with respect to the second insulating layer;

printing n parallel spaced second silver lines on the second insulating layer using conductive silver paste to form a second circuit layer, wherein each second silver line respectively comprises a main line and m branches connected thereto, and the main line of the second silver line is perpendicular to the first silver line and has one end including an electrode lead-out end;

forming m*n strain gauge head electrodes, m*n strain gauge tail electrodes, and m*n connecting wires by DIW printing using conductive carbon paste to form a functional layer, wherein one strain gauge head electrode is respectively printed at each through hole of the second insulating layer; the strain gauge head electrodes are communicated to the first silver lines on the first circuit layer through the through holes on the second insulating layer; one strain gauge tail electrode is printed at the tail end of the branch of each second silver line on the second circuit layer; each strain gauge head electrode corresponds to one strain gauge tail electrode and is connected to the strain gauge tail electrode through a connecting wire;

printing and forming a third insulating layer using an insulating material to complete encapsulation, wherein the third insulating layer covers other regions except the electrode lead-out ends of the first circuit layer, the electrode lead-out ends of the second circuit layer, and the strain gauge head electrodes and the strain gauge tail electrodes on the functional layer.

2. The novel DIW printing method according to claim 1, wherein a spacing between the respective through holes, directly facing each first silver line, on the second insulating layer is 3 mm.

3. The novel DIW printing method according to claim 1, wherein each through hole on the second insulating layer is a 0.5 mm×0.5 mm square hole.

4. The novel DIW printing method according to claim 1, wherein each second silver line is printed on the second insulating layer and is printed corresponding to a corresponding row of m through holes; the row of m through holes corresponding to the second silver line directly face m first silver lines, respectively; and each branch of the second silver line is printed on one side of one of the through holes in a manner of being parallel to the first silver line.

5. The novel DIW printing method according to claim 1, wherein a thickness of the first insulating layer is in a range of 45-75 um.

* * * * *